United States Patent
Wei

(10) Patent No.: US 10,194,126 B2
(45) Date of Patent: Jan. 29, 2019

(54) IMAGE PROCESSING METHOD, IMAGING APPARATUS, AND METHOD PERFORMED THEREBY

(71) Applicant: Guangdong Oppo Mobile Telecommunications Corp., Ltd., Dongguan (CN)

(72) Inventor: Yi Wei, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days.

(21) Appl. No.: 15/805,155

(22) Filed: Nov. 7, 2017

(65) Prior Publication Data

US 2018/0152683 A1    May 31, 2018

(30) Foreign Application Priority Data

Nov. 29, 2016    (CN) .......................... 2016 1 1079031

(51) Int. Cl.
| | |
|---|---|
| *H04N 9/64* | (2006.01) |
| *H04N 9/73* | (2006.01) |
| *G06T 3/40* | (2006.01) |
| *H04N 9/04* | (2006.01) |

(52) U.S. Cl.
CPC .......... *H04N 9/646* (2013.01); *G06T 3/4015* (2013.01); *H04N 9/735* (2013.01); *H04N 9/045* (2013.01); *H04N 2209/045* (2013.01); *H04N 2209/046* (2013.01)

(58) Field of Classification Search
None
See application file for complete search history.

(56) References Cited

U.S. PATENT DOCUMENTS

| | | | |
|---|---|---|---|
| 8,248,496 B2 | 8/2012 | Sekine et al. | |
| 2004/0165081 A1* | 8/2004 | Shibaki | .................... H04N 1/56 348/222.1 |
| 2005/0190200 A1* | 9/2005 | Arazaki | ................ G06T 3/4015 345/600 |
| 2007/0013794 A1* | 1/2007 | Tsuruoka | ................ H04N 9/045 348/241 |

(Continued)

FOREIGN PATENT DOCUMENTS

| | | |
|---|---|---|
| CN | 101588447 A | 11/2009 |
| CN | 101594464 A | 12/2009 |

(Continued)

*Primary Examiner* — James M Hannett
(74) *Attorney, Agent, or Firm* — Hodgson Russ LLP

(57) ABSTRACT

An image processing method includes determining whether a color of a current pixel of a first imitating image is same as a color of a related pixel of a color block image; when the same, using a pixel value of the related pixel as a pixel value of the current pixel; and when not the same, using pixel values of a related pixel unit to calculate the pixel value of the current pixel through interpolation. A color of the related pixel unit is same as the current pixel. A plurality of pixels of the related pixel unit are located in a first set of image pixel units of the color block image, wherein the first set of image pixel units neighbor a first image pixel unit that the related pixel belongs to. An imaging apparatus and a method performed by the imaging apparatus are also provided.

20 Claims, 15 Drawing Sheets

(56) References Cited

U.S. PATENT DOCUMENTS

| | | |
|---|---|---|
| 2009/0290028 A1 | 11/2009 | Yamasaki |
| 2013/0051665 A1 | 2/2013 | Shinozaki |
| 2014/0253808 A1 | 9/2014 | Tachi |
| 2016/0248956 A1 | 8/2016 | Mitsunaga |
| 2018/0063527 A1* | 3/2018 | Chen .................... H04N 19/117 |

FOREIGN PATENT DOCUMENTS

| | | |
|---|---|---|
| CN | 105516698 A | 4/2016 |
| CN | 105573522 A | 5/2016 |
| CN | 105611258 A | 5/2016 |
| CN | 106341670 A | 1/2017 |
| CN | 106412407 A | 2/2017 |
| CN | 106454054 A | 2/2017 |
| CN | 106454289 A | 2/2017 |
| CN | 106504217 A | 3/2017 |
| CN | 106504218 A | 3/2017 |
| CN | 106506984 A | 3/2017 |
| CN | 106507018 A | 3/2017 |
| CN | 106507067 A | 3/2017 |
| CN | 106507069 A | 3/2017 |
| CN | 106507080 A | 3/2017 |
| CN | 106534822 A | 3/2017 |
| EP | 2753073 A1 | 7/2014 |
| EP | 2753082 A1 | 7/2014 |

* cited by examiner

IMAGE PROCESSING METHOD, IMAGING APPARATUS, AND METHOD PERFORMED THEREBY

CROSS REFERENCE TO RELATED APPLICATION

This application is a non-provisional patent application, which claims priority to Chinese Application No. 201611079031.6, filed on Nov. 29, 2016. The entire disclosure of the above application is incorporated herein by reference.

FIELD OF THE DISCLOSURE

The present disclosure relates to a technical field of image processing, and more specifically, the present disclosure relates to an image processing method, an imaging apparatus, and a method performed by the imaging apparatus.

BACKGROUND OF THE DISCLOSURE

Existing image sensors include a pixel unit array and a color filter unit array disposed over the pixel unit array. Each color filter unit in the color filter unit array covers a corresponding pixel unit. Each pixel unit includes a plurality of photosensitive pixels. In operation, the image sensors may be controlled to be exposed to light and output a merged image. The merged image includes a merged pixel array. The plurality of photosensitive pixels of a same pixel unit are merged into a merged photosensitive pixel for output. In this manner, a signal to noise ratio of the merged image can be increased. However, resolution of the merged image is decreased.

DESCRIPTION OF THE DRAWINGS

Aspects and advantages of the present disclosure become apparent and easy to be understood from the following description of embodiments in conjunction with the accompanying drawings.

DETAILED DESCRIPTION OF THE EMBODIMENTS

Embodiments of the present disclosure are described in detail below and examples of the embodiments are illustrated in the accompanying drawings, wherein same or similar labels throughout the present disclosure represent corresponding same or similar elements or corresponding elements having same or similar functions. The description of the embodiments with reference to the accompanying drawings below is exemplary, aims at illustrating the present disclosure, and cannot be considered as limitations to the present disclosure.

Figure 1:
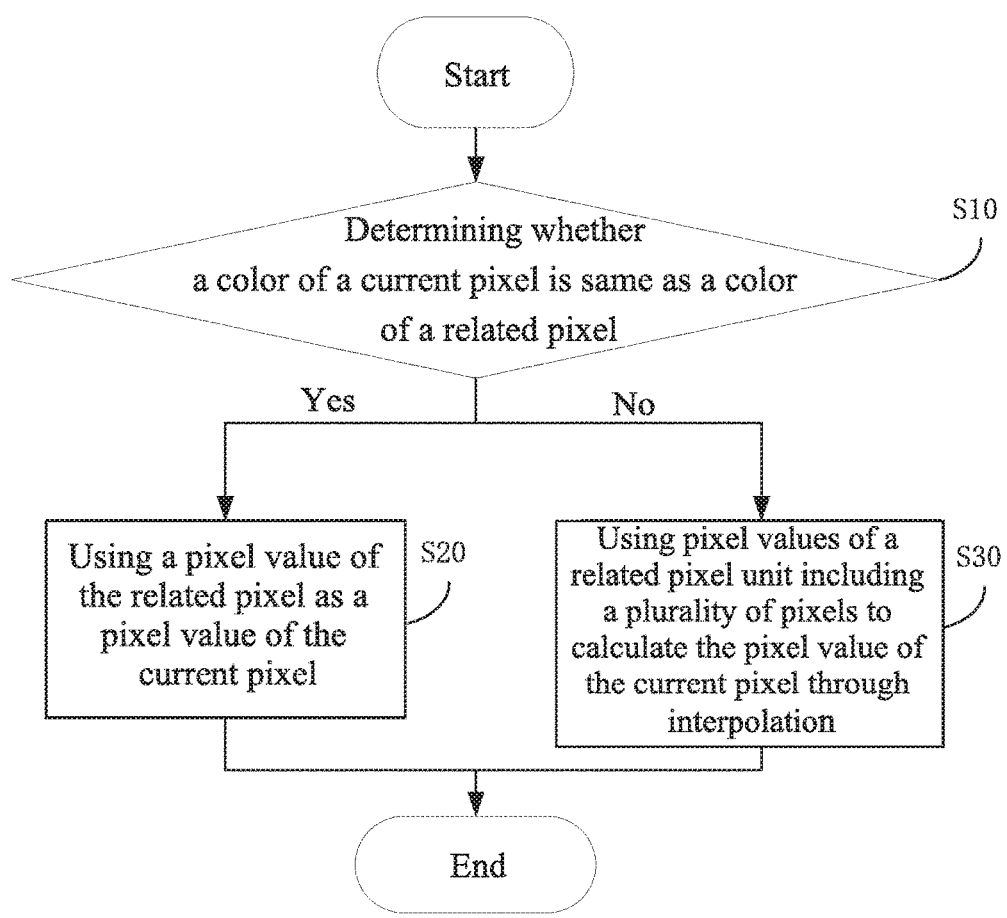
FIG. 1 is a schematic flowchart of an image processing method in accordance with an embodiment of the present disclosure.

FIG. 1 is an image processing method for converting a color block image into a first imitating image. The color block image includes a plurality of image pixel units arranged in a predetermined array pattern. Each of the plurality of image pixel units includes a plurality of original pixels having a same color. The first imitating image includes a plurality of imitating pixels arranged in the predetermined array pattern. The plurality of imitating pixels include a current pixel, and the plurality of original pixels of a first image pixel unit of the plurality of image pixel units include a related pixel corresponding to a position of the current pixel. The image processing method includes the following operations:

At block S10, determining whether a color of the current pixel is same as a color of the related pixel.

At block S20, when the color of the current pixel is same as the color of the related pixel, using a pixel value of the related pixel as a pixel value of the current pixel.

At block S30, when the color of the current pixel is different from the color of the related pixel, using pixel values of a related pixel unit including a plurality of pixels to calculate the pixel value of the current pixel through interpolation. A color of the plurality of pixels of the related pixel unit is same as the current pixel. The plurality of pixels of the related pixel unit are located in a first set of image pixel units in the plurality of image pixel units. The first set of image pixel units neighbor the first image pixel unit.

Figure 2:
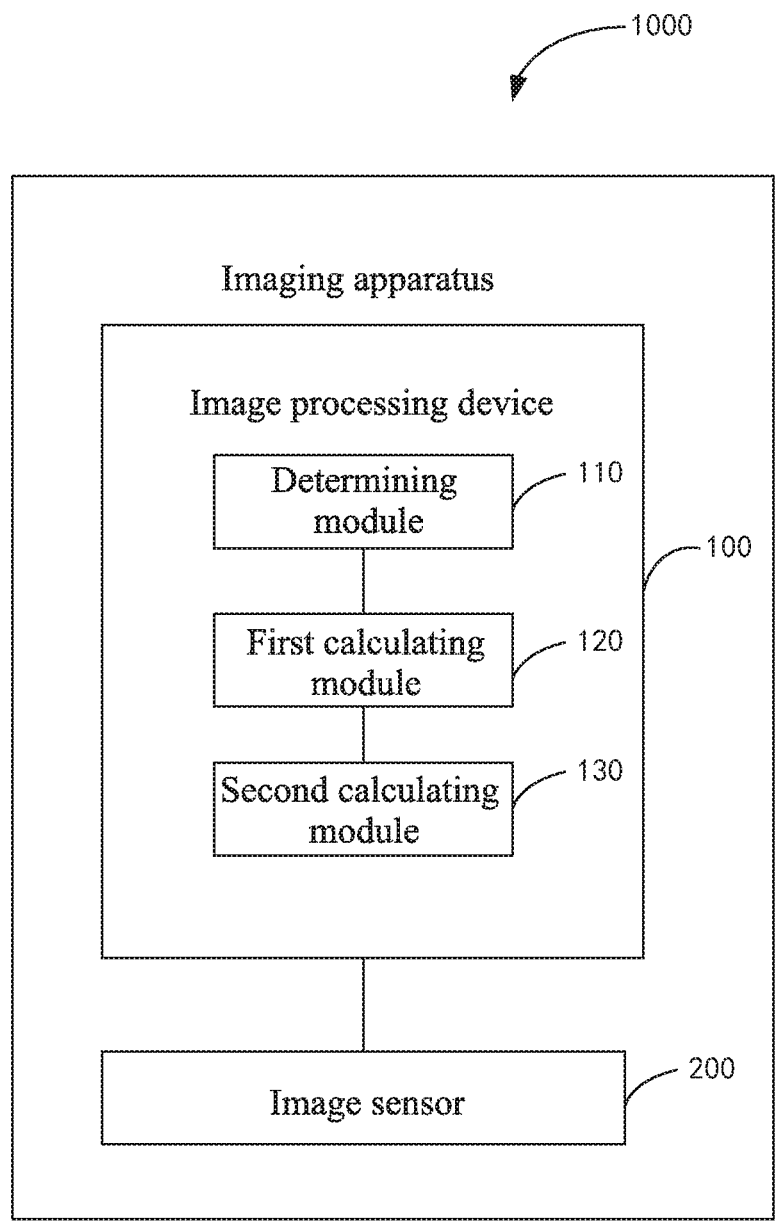
FIG. 2 is a schematic functional block diagram of an imaging apparatus in accordance with an embodiment of the present disclosure.

FIG. 2 is an image processing device 100 for converting a color block image into a first imitating image. The color block image includes a plurality of image pixel units arranged in a predetermined array pattern. Each of the plurality of image pixel units includes a plurality of original pixels having a same color. The first imitating image includes a plurality of imitating pixels arranged in the predetermined array pattern. The plurality of imitating pixels include a current pixel, and the plurality of original pixels of a first image pixel unit of the plurality of image pixel units include a related pixel corresponding to a position of the current pixel. The image processing device 100 includes a determining module 110, a first calculating module 120, and a second calculating module 130. As an example, the image processing method in FIG. 1 can be implemented by the image processing device 100 in FIG. 2 and applied to an imaging apparatus 1000 for processing the color block image output from an image sensor 200 of the image processing device 100.

It is to be noted that a term "imitating image" used herein refers to a first image that, through interpolation, imitates a second image taken using a first image sensor that includes a plurality of photosensitive pixels arranged in a predetermined array pattern such as a Bayer pattern. Similar to the second image, the first image may be directly processed into a true color image. A term "imitating pixel" used herein refers to a pixel in the "imitating image" that imitates a pixel output by a photosensitive pixel of the first image sensor.

Figure 3:
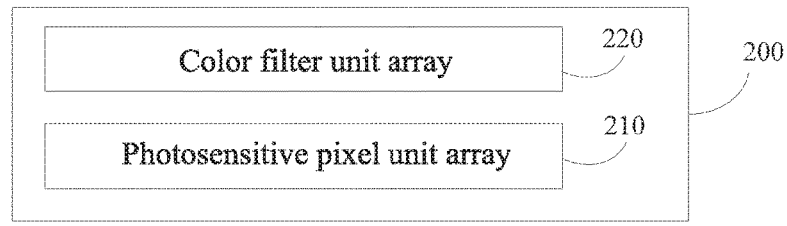
FIG. 3 is a schematic block diagram of an image sensor in accordance with an embodiment of the present disclosure.
Figure 6:
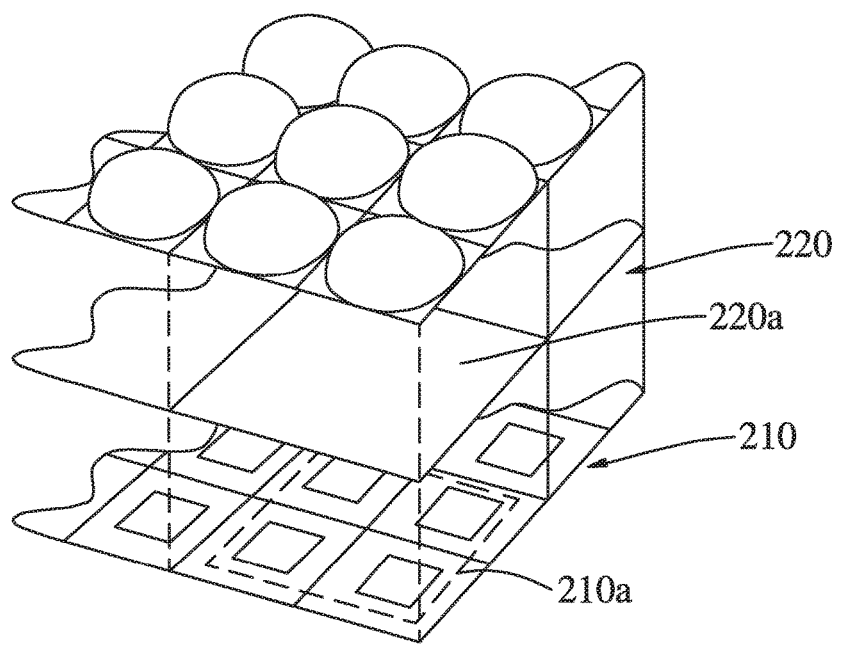
FIG. 6 is a schematic structural diagram of an image sensor in accordance with an embodiment of the present disclosure.

FIGS. 3 and 6 illustrate the image sensor 200 including a photosensitive pixel unit array 210 and a color filter unit array 220 disposed over the photosensitive pixel unit array 210.

Figure 4:
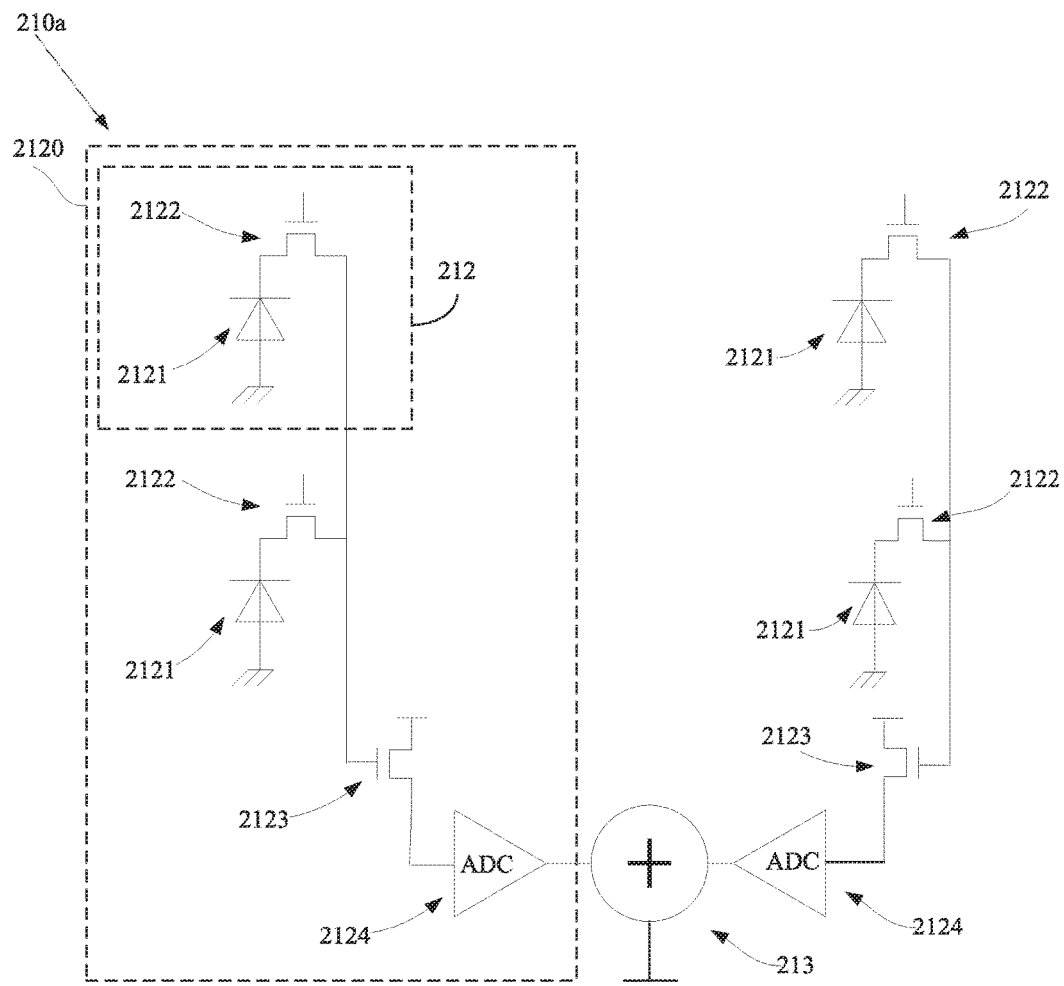
FIG. 4 is a schematic circuit diagram of a photosensitive pixel unit of the image sensor in accordance with an embodiment of the present disclosure.

Further, in FIGS. 3, 4, and 6, the photosensitive pixel unit array 210 includes a plurality of photosensitive pixel units 210a. Each photosensitive pixel unit 210a includes a plurality of photosensitive pixels 212 adjacent to each other. In FIG. 4, each photosensitive pixel 212 includes a photosensitive element 2121 and a transfer transistor 2122. The photosensitive element 2121 may be a photodiode and the transfer transistor 2122 may be a MOS transistor.

In FIGS. 3 and 6, the color filter unit array 220 includes a plurality of color filter units 220a. Each color filter unit 220a covers a corresponding photosensitive pixel unit 210a.

Figure 5:
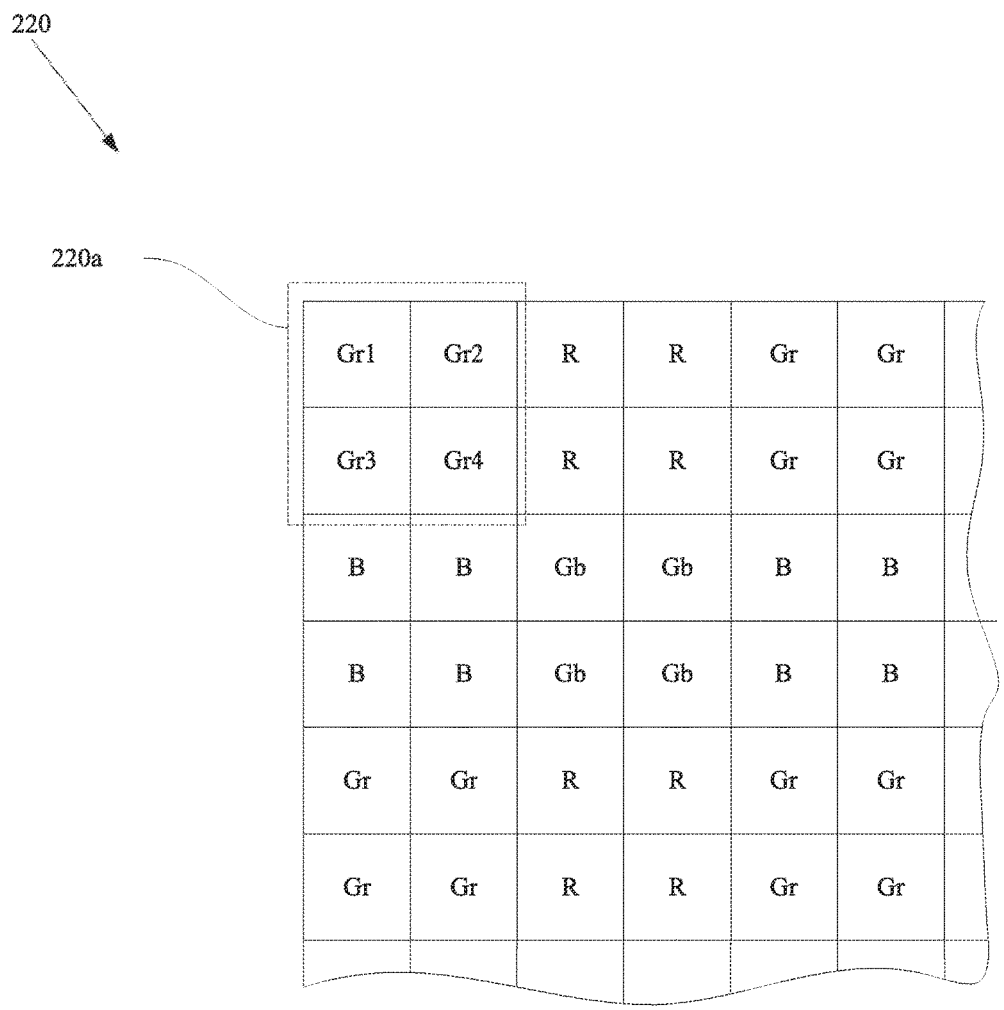
FIG. 5 is a schematic diagram of a color filter unit in accordance with an embodiment of the present disclosure.

Specifically, in FIGS. 3 and 5, in some examples, the color filter unit array 220 is arranged in a Bayer pattern. That is, four color filter units 220a adjacent to each other are a red color filter unit, a blue color filter unit and two green color filter units.

In FIGS. 4 and 6, each photosensitive pixel unit 210a corresponds to a color filter unit 220a having a uniform color. If a photosensitive pixel unit 210a includes n photosensitive elements 2121 adjacent to each other, then a color filter unit 220a covers the n photosensitive elements 2121 in the photosensitive pixel unit 210a. The color filter unit 220a may be integrally constructed or may be n independent color filters assembled together.

In FIG. 4, in an embodiment, each photosensitive pixel unit 210a includes four photosensitive pixels 212 adjacent to each other. Two of the photosensitive pixels 212 adjacent to each other form a photosensitive pixel sub-unit 2120 together. The photosensitive pixel sub-unit 2120 further includes a source follower 2123 and an analog-to-digital converter (ADC) 2124. The photosensitive pixel unit 210a further includes an adder 213. Each transfer transistor 2122 in the photosensitive pixel sub-unit 2120 has a terminal coupled to a cathode of the corresponding photosensitive element 2121. Each transfer transistor 2122 in the photosensitive pixel sub-unit 2120 has another terminal coupled to a gate terminal of the common source follower 2123. A source terminal of the source follower 2123 is coupled to the ADC 2124. The source follower 2123 may be a MOS transistor. Two photosensitive pixel sub-units 2120 are coupled to the adder 213 through corresponding source followers 2123 and corresponding ADCs 2124.

That is, four photosensitive elements 2121 adjacent to each other in a photosensitive pixel unit 210a of the image sensor 200 commonly use a color filter unit 220a having a uniform color. Each photosensitive element 2121 is coupled to a corresponding transfer transistor 2122, and two photosensitive elements 2121 adjacent to each other are coupled to a common source follower 2123 and a common ADC 2124. The four photosensitive elements 2121 adjacent to each other are coupled to a common adder.

Further, the four photosensitive elements 2121 are arranged in a 2*2 array. The two photosensitive elements 2121 in the photosensitive pixel sub-unit 2120 may be located in a same column.

In FIGS. 4 and 6, during imaging, when each two photosensitive pixel sub-units 2120, i.e., each four photosensitive elements 2121, covered by the same color filter unit 220a are exposed to light at the same time, the pixels may be merged and a merged image may be output.

Specifically, the photosensitive element 2121 is configured to convert light into charges. The generated charges are proportional to intensity of the light. The transfer transistor 2122 is configured to control conduction or cutoff of a circuit based on a control signal. When the circuit conducts, the source follower 2123 is configured to convert the charges generated by the photosensitive element 2121 being exposed to light into a voltage signal. The ADC 2124 is configured to convert the voltage signal into a digital signal. The adder 213 is configured to add two digital signals and output commonly to the image processing device 100 in FIG. 2 coupled to the image sensor 200 in FIG. 2 for processing.

Figure 7:
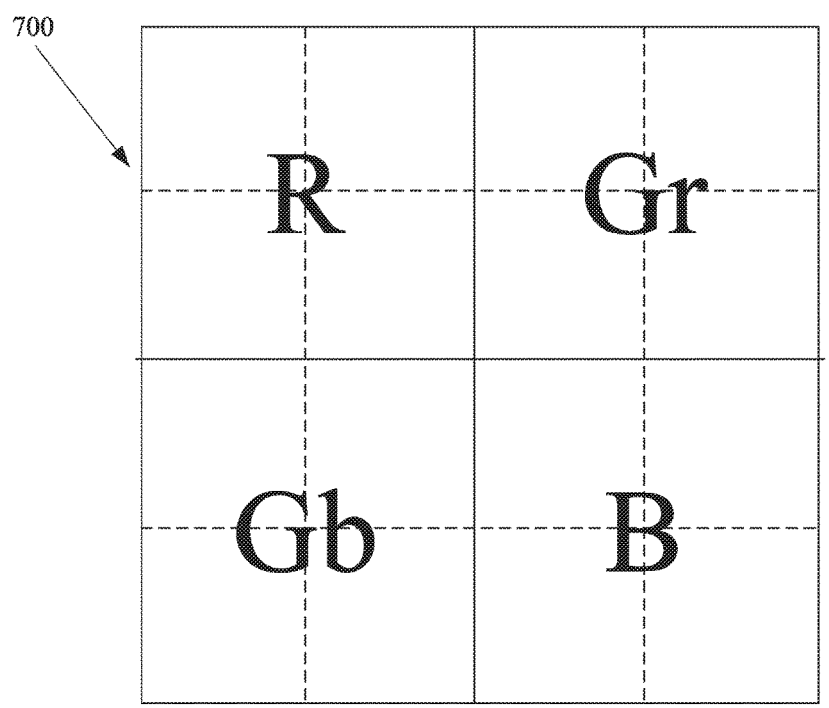
FIG. 7 is a schematic diagram of a state of a merged image in accordance with an embodiment of the present disclosure.

In FIGS. 3 and 7, taking a 16M image sensor 200 as an example, the image sensor 200 may merge 16M of photosensitive pixels into 4M of merged photosensitive pixels. That is, the image sensor 200 may output the merged image 700. After merging, a size of a merged photosensitive pixel becomes 4 times a size of a photosensitive pixel, thereby enhancing a sensitivity of the merged photosensitive pixel. In addition, because noise in the image sensor 200 is mostly random noise, with respect to four photosensitive pixels before being merged, noise may exist in one or two of the four photosensitive pixels. After the four photosensitive pixels are merged into the merged photosensitive pixel, the impact of the noise in the one or two of the four photosensitive pixels on the merged photosensitive pixel is reduced. That is, the noise in the image sensor 200 is reduced, and a signal to noise ratio is increased.

However, at the same time when each four photosensitive pixels become a merged photosensitive pixel, resolution of the merged image 700 is decreased.

In FIGS. 4 and 6, during imaging, when each four photosensitive elements 2121 covered by the same color filter unit 220a are exposed to light sequentially, after image processing, a color block image may be output.

Specifically, the photosensitive element 2121 is configured to convert light into charges. The generated charges are proportional to intensity of the light. The transfer transistor 2122 is configured to control conduction or cutoff of the circuit based on a control signal. When the circuit conducts, the source follower 2123 is configured to convert the charges generated by the photosensitive element 2121 being exposed to light into a voltage signal. The ADC 2124 is configured to convert the voltage signal into a digital signal and output to the image processing device 100 in FIG. 2 coupled to the image sensor 200 in FIG. 2.

Figure 8:
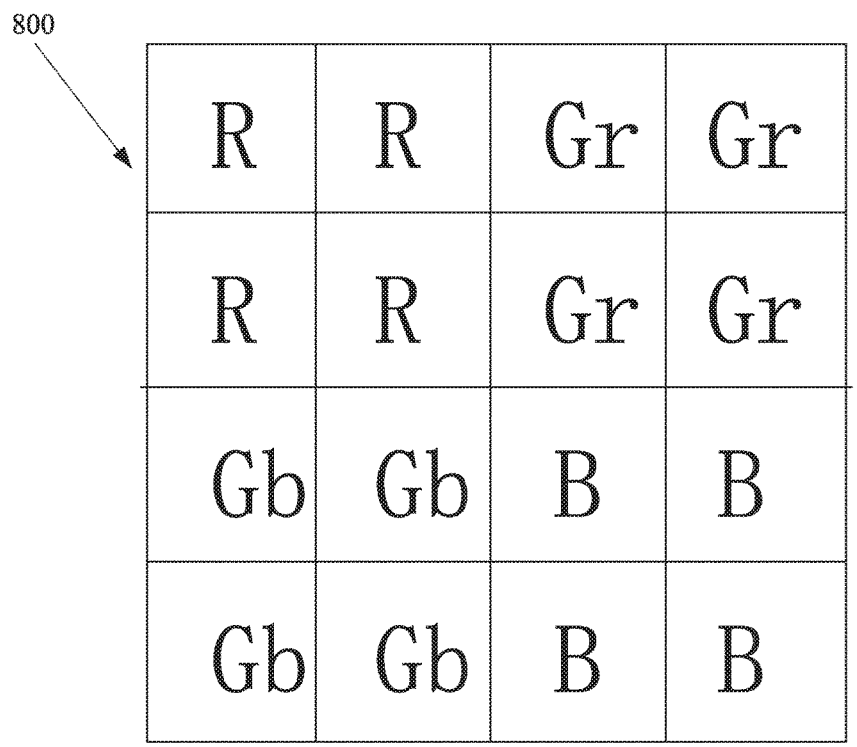
FIG. 8 is a schematic diagram of a state of a color block image in accordance with an embodiment of the present disclosure.

In FIGS. 3 and 8, taking a 16M image sensor 200 as an example, the image sensor 200 may further keep 16M of photosensitive pixels for output. That is, the image sensor 200 may output the color block image 800. The color block image 800 includes a plurality of image pixel units. Each of the plurality of image pixel units includes a plurality of original pixels arranged in a 2*2 array. A size of each of the plurality of original pixels is same as the size of a corresponding photosensitive pixel. However, because the color filter unit 220a covering each four photosensitive elements 2121 adjacent to each other have a uniform color, although four photosensitive elements 2121 are exposed to light separately, four output original pixels adjacent to each other in each of the plurality of image pixel units have the same color. Therefore, resolution of the color block image 800 cannot be increased.

In accordance with an embodiment of the present disclosure, an image processing method for converting the output color block image into a first imitating image is provided.

It is to be understood that when the merged image is being output, each four photosensitive pixels adjacent to each other having the same color is merged into the merged photosensitive pixel for output. In this manner, each four merged pixels adjacent to each other in the merged image may be regarded as being arranged in a typical Bayer pattern, and therefore the merged image may be received by a processing module, and directly processed by the processing module into a true color image. When the color block image is being output, each photosensitive pixel outputs separately. Because each four photosensitive pixels adjacent to each other have the same color, four original pixels adjacent to each other in each of the plurality of image pixel units have the same color, and therefore, the four original pixels may be regarded as being arranged in a non-typical Bayer pattern. The processing module cannot directly process the non-typical Bayer pattern. That is, when the image sensor 200 uses the same processing module, for two modes for outputting true color images, i.e., the true color image output under a merged mode, and the true color image output under a color block mode, to be compatible, the color block image needs to be converted into the first imitating image. In other words, each of the plurality of image pixel units having an arrangement of the non-typical Bayer pattern is converted into having an arrangement of the typical Bayer pattern.

The first imitating image includes a plurality of imitating pixels arranged in the Bayer pattern. The plurality of imitating pixels include a current pixel, and the plurality of original pixels of a first image pixel unit of the plurality of image pixel units include a related pixel corresponding to a position of the current pixel.

Figure 9:
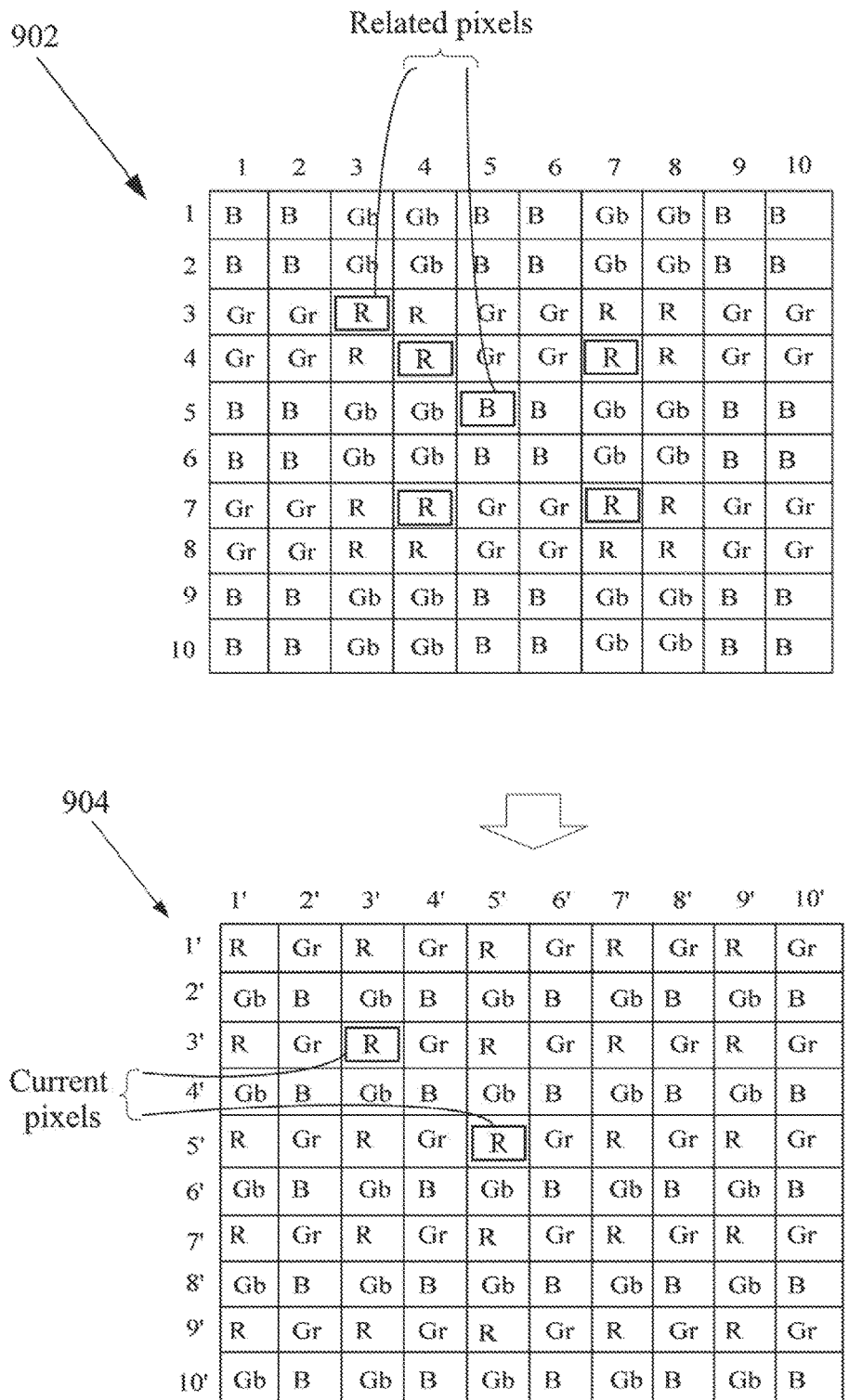
FIG. 9 is a schematic diagram of a state of a color block image and a state of a first imitating image illustrating an image processing method in accordance with an embodiment of the present disclosure.

In FIG. 9, taking FIG. 9 as an example, current pixels are R3' 3' and R5' 5' in a first imitating image 904, and corresponding related pixels are R33 and R55 in a color block image 902.

When obtaining the current pixel R3'3', because the related pixel R33 corresponding to the current pixel R3'3' has a same color as the current pixel R3'3', a pixel value of the related pixel R33 is directly used as a pixel value of the current pixel R3'3'.

When obtaining the current pixel R5'5', because the related pixel R55 corresponding to the current pixel R5'5' has a different color from the current pixel R5'5', a pixel value of the related pixel R55 cannot be directly used as a pixel value of the current pixel R5'5'. A related pixel unit of the current pixel R5'5'need to be used for calculating the pixel value of the current pixel R5'5' through interpolation.

It is to be noted that a pixel value in the description above and below should be broadly considered a color attribute value of a pixel, such as a color value.

The related pixel unit includes a plurality of, such as 4, original pixels in a first set of image pixel units having a same color as the current pixel. The first set of image pixel units neighbor the first image pixel unit.

It is to be noted that a term "neighbor" used herein should be broadly understood. Taking FIG. 9 as an example, the related pixel R55 corresponds to the current pixel R5'5'. The first set of image pixel units neighboring the first image pixel unit that the related pixel R55 belongs to and having the same color as the current pixel R5'5' are image pixel units that pixels R44, R74, R47, R77 belong to and are not other red image pixel units spatially farther away from the first image pixel unit that the related pixel R55 belongs to. Red original pixels spatially closest to the related pixel R55 are the pixels R44, R74, R47, and R77. That is, the related pixel unit of the current pixel R5'5' consists of the pixels R44, R74, R47, and R77. The current pixel R5'5' has the same color as the pixels R44, R74, R47, and R77, and corresponds to the related pixel R55 neighboring the pixels R44, R74, R47, and R77.

In this manner, with respect to different situations for the current pixels, different methods for converting an original pixel into an imitating pixel are used, thereby converting the color block image 902 into the first imitating image 904. During taking images, special color filters arranged in the Bayer pattern are used, and therefore, a signal to noise ratio of the images may be increased. During image processing, the color block image 902 may be processed through interpolation, and therefore, resolution of the images may be increased.

Figure 10:
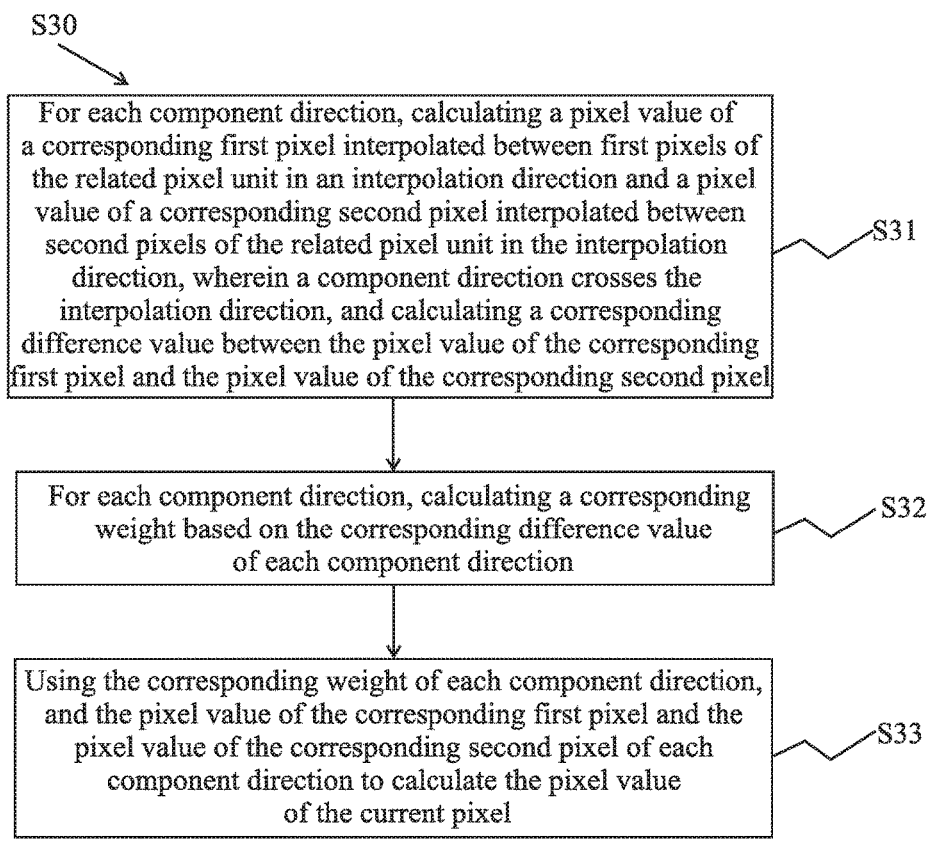
FIG. 10 is a schematic flowchart of an operation of the image processing method in accordance with an embodiment of the present disclosure.

In FIG. 10, in an embodiment, the block S30 includes following operations.

At block S31, for each component direction, calculating a pixel value of a corresponding first pixel interpolated between first pixels of the related pixel unit in an interpolation direction and a pixel value of a corresponding second pixel interpolated between second pixels of the related pixel unit in the interpolation direction, wherein a component direction crosses the interpolation direction, and calculating a corresponding difference value between the pixel value of the corresponding first pixel and the pixel value of the corresponding second pixel.

At block S32, for each component direction, calculating a corresponding weight based on the corresponding difference value of each component direction.

At block S33, using the corresponding weight of each component direction, and the pixel value of the corresponding first pixel and the pixel value of the corresponding second pixel of each component direction to calculate the pixel value of the current pixel.

Figure 11:
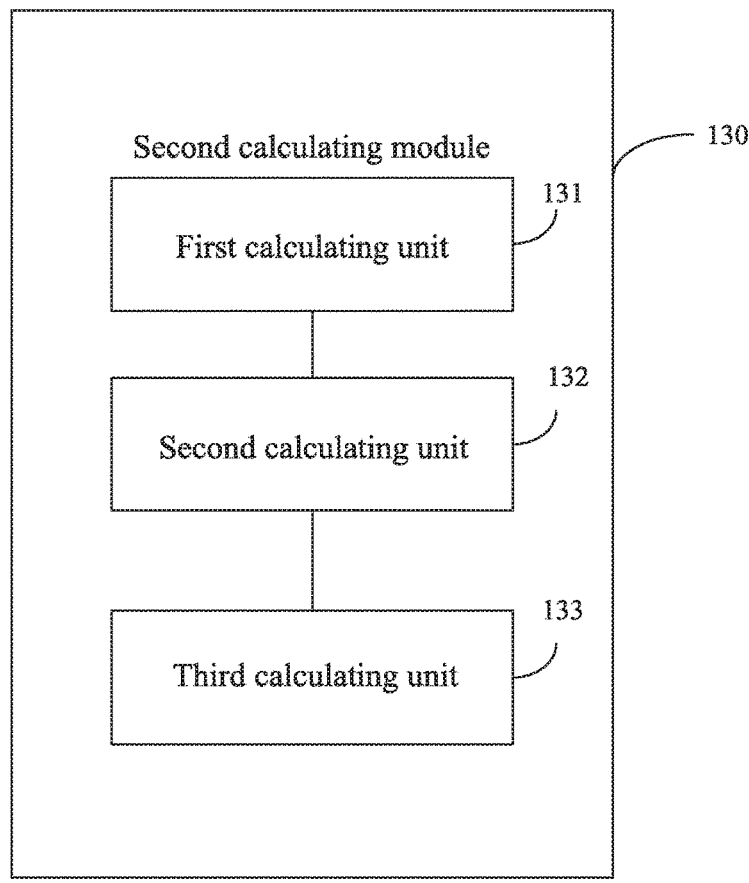
FIG. 11 is a functional block diagram of a second calculating module in accordance with an embodiment of the present disclosure.

In FIG. 11, in an embodiment, the second calculating module 130 includes a first calculating unit 131, a second calculating unit 132, and a third calculating unit 133. The block S31 may be implemented by the first calculating unit 131. The block S32 may be implemented by the second calculating unit 132. The block S33 may be implemented by the third calculating unit 133. That is, the first calculating unit 131 is configured to, for each component direction, calculate a pixel value of a corresponding first pixel interpolated between first pixels of the related pixel unit in an interpolation direction and a pixel value of a corresponding second pixel interpolated between second pixels of the related pixel unit in the interpolation direction, wherein a component direction crosses the interpolation direction. The first calculating unit 131 is further configured to calculate a corresponding difference value between the pixel value of the corresponding first pixel and the pixel value of the corresponding second pixel. The second calculating unit 132 is configured to, for each component direction, calculate a corresponding weight based on the corresponding difference value of each component direction. The third calculating unit 133 is configured to use the corresponding weight of each component direction, and the pixel value of the corresponding first pixel and the pixel value of the corresponding second pixel of each component direction to calculate the pixel value of the current pixel.

Specifically, processing through interpolation considers corresponding energy difference values of an image for the different component directions. Through linear interpolation using the corresponding weights for the different component directions, wherein the corresponding weights are based on corresponding difference values of the related pixel unit in the different component directions, the pixel value of the current pixel is calculated. For a component direction of a smaller energy difference value, a reference weight is larger, which causes a weight used during interpolation to be larger.

In an example, for ease of calculation, only horizontal and vertical directions are considered.

The pixel value of the current pixel R5'5' is obtained through interpolation using pixel values of the pixels R44, R74, R47, and R77. Because original pixels having a same color as the current pixel R5'5' in horizontal and vertical component directions do not exist, interpolated pixel values in the horizontal and vertical component directions are calculated using the related pixel unit. For the horizontal component direction, a pixel value of a first pixel R45 interpolated between first pixels R44 and R47 of the related pixel unit in a vertical interpolation direction and a pixel value of a second pixel R75 interpolated between second pixels R74 and R77 of the related pixel unit in the vertical interpolation direction are calculated. For the vertical component direction, a pixel value of a first pixel R54 interpolated between first pixels R44 and R74 of the related pixel unit in a horizontal interpolation direction and a pixel value of a second pixel R57 interpolated between second pixels R47 and R77 of the related pixel unit in the horizontal interpolation direction are calculated.

Specifically, R45=R44*2/3+R47*1/3, R75=2/3*R74+1/3*R77, R54=2/3*R44+1/3*R74, and R57=2/3*R47+1/3*R77. For convenience, herein, pixel values of pixels such as the pixels R44, R45, R47, R54, R57, R74, R75, and R77 are represented by the same symbols as those of the pixels.

For each of the horizontal and vertical component directions, a corresponding difference value and a corresponding weight are calculated. That is, based on the corresponding difference value of the color for each of the horizontal and vertical component directions, a corresponding weight referenced during interpolation is determined. For a component direction of a smaller difference value, a weight is larger, and for a component direction of a larger difference value, a weight is smaller. Specifically, for the horizontal component direction, a difference value X1 between the pixel value of the first pixel R45 and the pixel value of the second pixel R75 is calculated by X1=|R45−R75|. For the vertical component direction, a difference value X2 between the pixel value of the first pixel R54 and the pixel value of the second pixel R75 is calculated by X2=|R54−R57|. For the horizontal component direction, a weight W2 is calculated by W2=X2/(X1+X2). For the vertical component direction, a weight W1 is calculated by W1=X1/(X1+X2).

Then, through linear interpolation using corresponding weights W2 and W1 for the horizontal and vertical component directions, the pixel value of the current pixel R5'5' is calculated by R5'5'=(2/3*R45+1/3*R75)*W2+(2/3*R54+1/3*R57)*W1. It is to be understood that if the difference value X1 is larger than the difference value X2, then the weight W1 is larger than the weight W2. Therefore, the weight for the horizontal component direction is the weight W2, and the weight for the vertical interpolation direction is the weight W1, and vice versa.

In this manner, the pixel value of the current pixel may be calculated through interpolation. Based on the above image processing method, the plurality of original pixels of each image pixel unit may be converted into imitating pixels arranged in the typical Bayer pattern. That is, four imitating pixels adjacent to each other and arranged in a 2*2 array include a red imitating pixel, two green imitating pixels, and a blue imitating pixel.

It is to be noted that interpolation includes but is not limited to the manner in which only pixel values of a same color for the vertical and horizontal directions are considered during calculation as in the present embodiment. Pixel values of other colors may, for example, be further considered.

Figure 12:
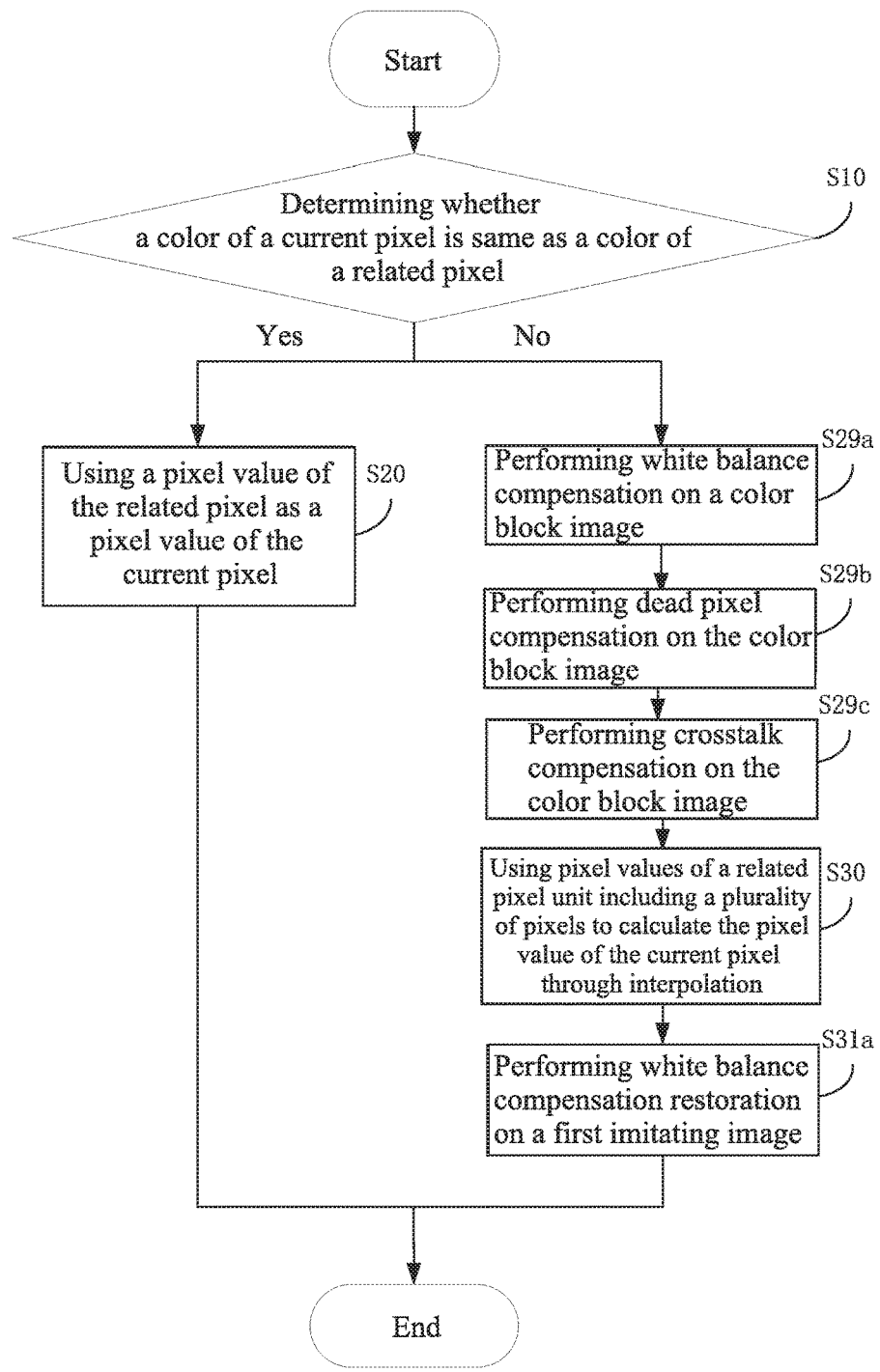
FIG. 12 is a schematic flowchart of an image processing method in accordance with an embodiment of the present disclosure.

In FIG. 12, in an embodiment, before block S30, the image processing method further includes the following operation.

At block S29*a*, performing white balance compensation on the color block image.

After block S30, the image processing method further includes the following operation.

At block S31*a*, performing white balance compensation restoration on the first imitating image.

Figure 13:
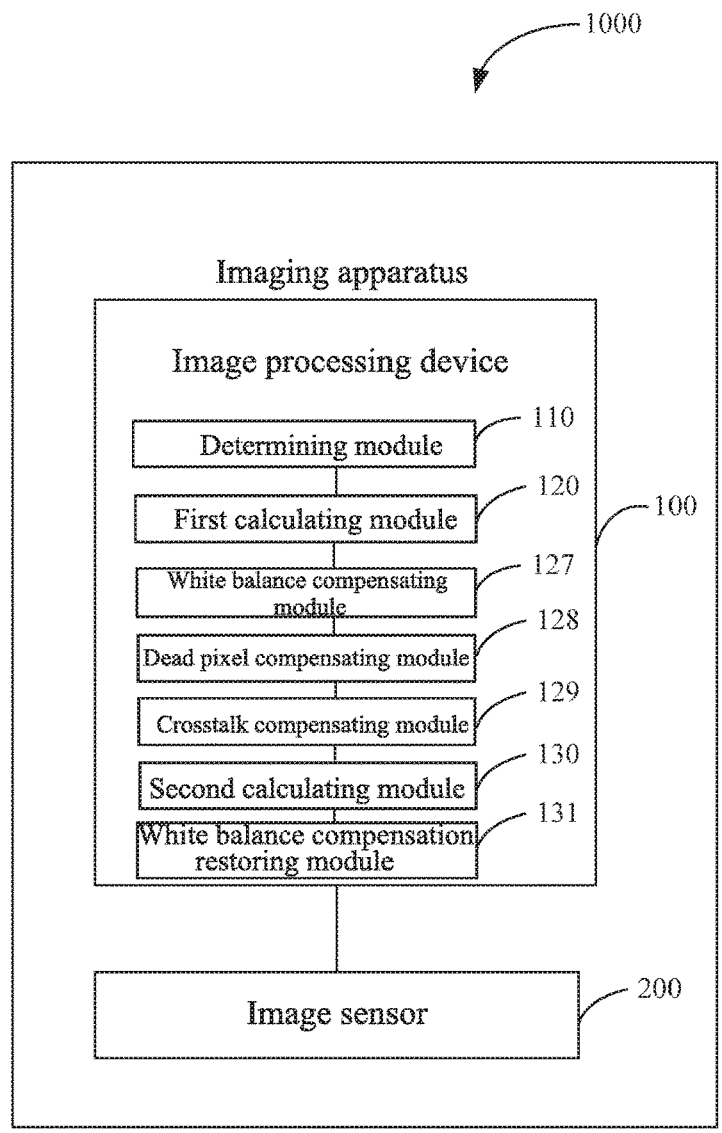
FIG. 13 is a schematic functional block diagram of an image processing device in accordance with an embodiment of the present disclosure.

In FIG. 13, in an embodiment, the image processing device 100 further includes a white balance compensating module 127 and a white balance compensation restoring module 131. The block S29*a* may be implemented by the white balance compensating module 127. The block S31*a* may be implemented by the white balance compensation restoring module 131. That is, the white balance compensating module 127 is configured to perform white balance compensation on the color block image. The white balance compensation restoring module 131 is configured to perform white balance compensation restoration on the first imitating image.

Specifically, in an example, during interpolation during converting the color block image into the first imitating image, red and blue imitating pixels not only refer to colors of original pixels of corresponding same color channels, but also refer to color weights of original pixels of a green channel. Therefore, before interpolation, white balance compensation needs to be performed, so as to eliminate the effect of white balance compensation on interpolation. In order not to break white balance of the color block image, after interpolation, white balance compensation restoration needs to be performed on the first imitating image. Restoration is performed based on red, green, and blue gain values during compensation.

In this manner, the effect of white balance is eliminated during interpolation, and white balance of the color block image can be kept for the first imitating image after interpolation.

In FIGS. 12 and 13, in an embodiment, before block S30, the image processing method further includes the following operation.

At block S29b, performing dead pixel compensation on the color block image.

In an embodiment, the image processing device 100 further includes a dead pixel compensating module 128. The block S29b may be implemented by the dead pixel compensating module 128. That is, the dead pixel compensating module 128 is configured to perform dead pixel compensation on the color block image.

It is to be understood that limited by a manufacturing process, dead pixels may exist in the image sensor 200. The dead pixels usually do not change with sensitivity and always exhibit same pixel values. The presence of the dead pixels affects image quality. Therefore, in order to ensure interpolation to be accurate and not affected by the dead pixels, dead pixel compensation needs to be performed before interpolation.

Specifically, during dead pixel compensation, detection may be performed on original pixels, and when a certain original pixel is detected as a dead pixel, dead pixel compensation may be performed based on pixel values of other original pixels in the image pixel unit that the certain original pixel belongs to.

In this manner, the impact of the dead pixels on interpolation may be eliminated, thereby increasing image quality.

In FIGS. 12 and 13, in an embodiment, before block S30, the image processing method further includes the following operation.

At block S29c, performing crosstalk compensation on the color block image.

In an embodiment, the image processing device 100 further includes a crosstalk compensating module 129. The block S29c may be implemented by the crosstalk compensating module 129. That is, the crosstalk compensating module 129 is configured to perform crosstalk compensation on the color block image.

Specifically, four photosensitive pixels in a photosensitive pixel unit are covered by color filters having a same color. Sensitivity differences may exist among the photosensitive pixels, such that fixed pattern noise exists in a solid color region in a true color image converted from the first imitating image, thereby affecting image quality. Hence, crosstalk compensation needs to be performed on the color block image.

Figures 14, 15:
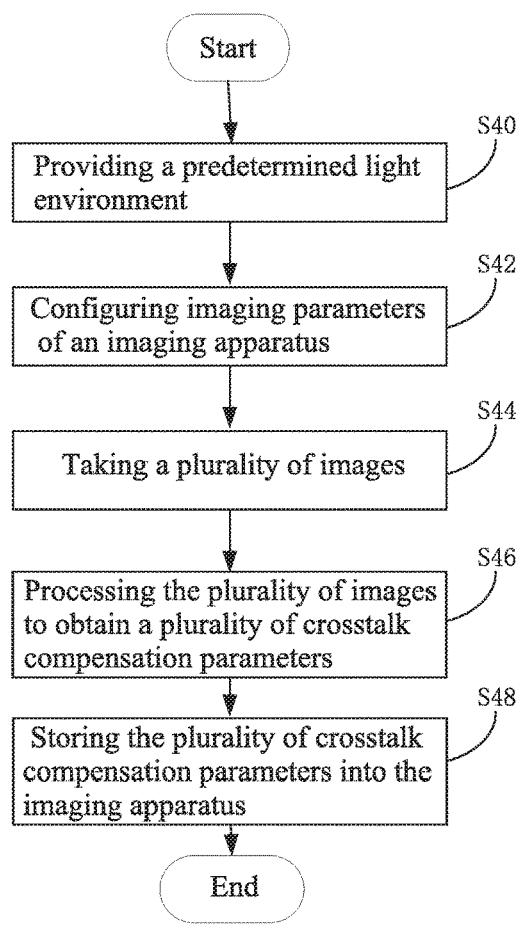
FIG. 14 is a schematic flowchart of a manufacturing method in accordance with an embodiment of the present disclosure.
FIG. 15 is a schematic diagram of a plurality of image pixel units of a color block image in accordance with an embodiment of the present disclosure.

In FIG. 14, in an embodiment, a manufacturing method for manufacturing the imaging apparatus 1000 includes the following operations.

At block S40, providing a predetermined light environment.

At block S42, configuring imaging parameters of an imaging apparatus.

At block S44, taking a plurality of images.

At block S46, processing the plurality of images to obtain a plurality of crosstalk compensation parameters.

At block S48, storing the plurality of crosstalk compensation parameters into the imaging apparatus.

As described above, in order to perform crosstalk compensation, during the image sensor 200 of the imaging apparatus 1000 is manufactured, the plurality of crosstalk compensation parameters need to be obtained and pre-stored into a memory of the imaging apparatus 1000, or an electronic apparatus, such as a cell phone or a tablet, configured with the imaging apparatus 1000.

The predetermined light environment may, for example, include an LED uniform light guide plate, a color temperature of about 5000K, and a brightness of about 1000 lux. The imaging parameters may include a gain value, a shutter value and a lens position. After relevant parameters are configured, the plurality of crosstalk compensation parameters are obtained.

During the process of obtaining the plurality of crosstalk compensation parameters, first, a plurality of color block images are obtained under the predetermined light environment with the configured imaging parameters. The plurality of color block images are merged into a merged color block image. In this manner, the impact of noise from using a single color block image as a correction basis may be reduced.

In FIG. 15, taking an image pixel unit Gr as an example, the image pixel unit Gr includes original pixels Gr1, Gr2, Gr3, and Gr4. The purpose of crosstalk compensation is to calibrate sensitivity of photosensitive pixels which may be different to a same level through compensation. The image pixel unit Gr has an average pixel value Gr_avg calculated by Gr_avg=(Gr1+Gr2+Gr3+Gr4)/4. The average pixel value Gr_avg basically represent an average level of sensitivity of the four photosensitive pixels. Using the average pixel value Gr_avg as a base value, ratios of the pixel values of the original pixels Gr1, Gr2, Gr3, and Gr4 to the average pixel value Gr_avg of the image pixel unit Gr can be correspondingly calculated by Gr1/Gr_avg, Gr2/Gr_avg, Gr3/Gr_avg, and Gr4/Gr_avg. It is to be understood that each of the ratios may basically reflect a deviation of the pixel value of the corresponding original pixel Gr1, Gr2, Gr3, or Gr4 from the base value. The four ratios are recorded as crosstalk compensation parameters in the memory of the imaging apparatus 1000, so as to be retrieved during imaging for crosstalk compensation to be performed on each of the original pixels Gr1, Gr2, Gr3, and Gr4. In this manner, crosstalk may be reduced and image quality may be increased.

Usually, after configuring the plurality of crosstalk compensation parameters, accuracy of the plurality of crosstalk compensation parameters should be further verified.

During verification, first, a color block image is taken under the same light environment and with the same imaging parameters. Then, crosstalk compensation is performed on the color block image using the crosstalk compensation parameters calculated. An average pixel value Gr'_avg, and ratios calculated by Gr'1/G'_avg, Gr'2/G'_avg, Gr'3/Gr'_avg, and Gr'4/Gr'_avg are obtained after compensation. Based on an obtained result, accuracy of the crosstalk compensation parameters is determined. Determination may be considered in terms of macro and micro perspectives. The micro perspective refers to a certain original pixel still having a larger deviation after compensation, which is easily perceived by a user after imaging. The macro perspective refers to, from a global point of view, a total number of original pixels still having deviations after compensation is relatively high, which, even though a deviation of each single original pixel is not large, would still be perceived by the user as a whole. Therefore, a ratio threshold is configured for the micro perspective, and a ratio threshold and a number threshold are configured for the macro perspective. In this manner, the plurality of crosstalk compensation parameters configured may be verified for accuracy, so as to reduce the impact of crosstalk on image quality.

Figure 16:
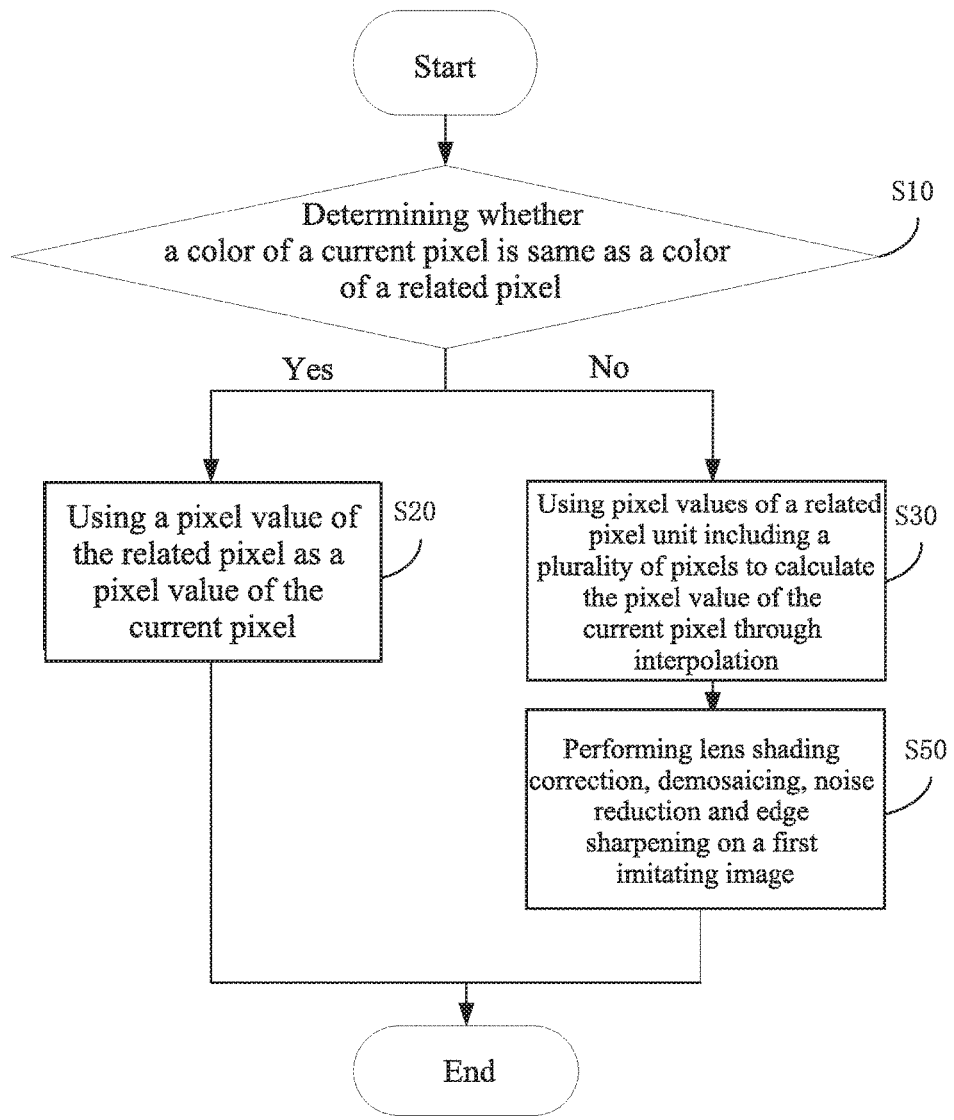
FIG. 16 is a schematic flowchart of an image processing method in accordance with an embodiment of the present disclosure.
Figure 17:
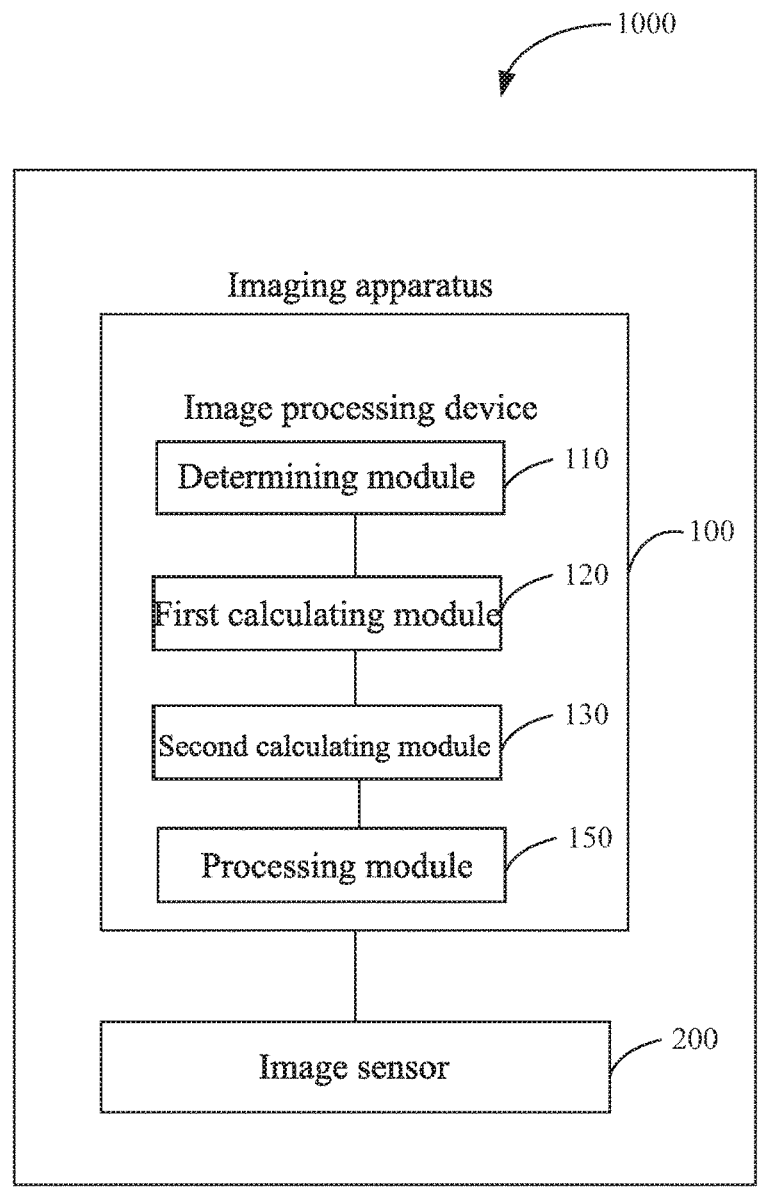
FIG. 17 is a functional block diagram of an image processing device in accordance with an embodiment of the present disclosure.

In FIGS. 16 and 17, in an embodiment, after block S30, the image processing method further includes the following operation.

At block S50, performing lens shading correction, demosaicing, noise reduction, and edge sharpening on the first imitating image.

In an embodiment, the image processing device 100 further includes a processing module 150. The block S50 may be implemented by the processing module 150. That is, the processing module 150 is configured to perform lens shading correction, demosaicing, noise reduction, and edge sharpening on the first imitating image.

It is to be understood that after the color block image is converted into the first imitating image which is arranged in the typical Bayer pattern, the processing module 150 may be used to process the first imitating image. The processing process performed by the processing module 150 includes lens shading correction, demosaicing, noise reduction, and edge sharpening. After processing, a true color block image may be obtained and output to the user.

In the description of the present disclosure, it is to be appreciated that orientation or location relationships indicated by terms such as "central", "longitudinal", "lateral", "length", "width", "thickness", "up", "down", "front", "back", "left", "right", "vertical", "horizontal", "top", "bottom", "inner", "outer", "clockwise", and "counterclockwise" and are based on orientation or location relationships illustrated in the accompanying drawings. The terms are only used to facilitate the description of the present disclosure and to simplify the description, not used to indicate or imply the relevant device or element must have a particular orientation or must be structured and operate under the particular orientation and therefore cannot be considered as limitations to the present disclosure.

In addition, the terms "first" and "second" are only used for description purpose, and cannot be considered as indicating or implying relative importance or implicitly pointing out the number of relevant technical features. Thus, features being correspondingly defined as "first" and "second" may each expressly or implicitly include at least one of the features. In the description of the present disclosure, the meaning of "a plurality of" is at least two, such as two and three, unless otherwise definitely and specifically defined.

In the present disclosure, unless otherwise definitely specified and defined, a first feature being "above" or "below" a second feature may include the first feature directly in contact with the second feature, and may also include the first feature not directly in contact with and the second feature but through an intervening feature. Further, the first feature being "above", "over", and "beyond" the second feature may include the first feature being "directly above" and "obliquely above" the second feature, or only represents a level of the first feature is higher than a level of the second feature. The first feature being "below", "under", and "beneath" the second feature may include the first feature being "directly below" and "obliquely below" the second feature, or only represents a level of the first feature is lower than a level of the second feature.

The above description provides various embodiments or examples for implementing various structures of the present disclosure. To simplify the description of the present disclosure, parts and configurations of specific examples are described above. Certainly, they are only illustrative, and are not intended to limit the present disclosure. Further, reference numerals and reference letters may be repeated in different examples. This repetition is for purposes of simplicity and clarity and does not indicate a relationship of the various embodiments and/or the configurations. Furthermore, the present disclosure provides specific examples of various processes and materials; however, applications of other processes and/or other materials may be appreciated by those skilled in the art.

In the description of the present specification, reference terms "an embodiment", "some embodiments", "an illustrative embodiment", "an example", "a specific example", "some examples", and so on mean that specific features, structures, materials, or characteristics described in conjunction with the embodiments or examples are included in at least one of the embodiments or the examples. In the present specification, the illustrative description of the above-mentioned terms is not limited to the same embodiment or example. Moreover, the described specific features, structures, materials, or characteristics may be combined in a proper way in any one or more of the embodiments or examples.

Any process or method provided in the flowcharts or described by other ways may be appreciated to represent that one or more code modules, code fragments or code parts of executable instructions for implementing specific logical functions or process operations are included. Moreover, the scope of the preferred embodiments of the present disclosure includes other implementations, such as those not in the sequence illustrated or discussed and including functions executed at the same time or in reverse order based on involved functions. These should be appreciated by those skilled in the art to which the present disclosure pertains.

Any logical function and/or operation represented by the flowcharts or described by other ways may, for example, be considered a sequence table of executable instructions for implementing logical function, and may be specifically implemented in computer-readable media for being used by instruction-executing systems, apparatuses or devices (such as computer-based systems, systems including a processing module, or other systems that may retrieve instructions from the instruction-executing systems, apparatuses or devices, and execute the instructions), or used by any combination of the instruction-executing systems, apparatuses or devices. With respect to the present specification, "computer-readable media" may be non-transitory media that may include stored, communicated, propagated or transmitted programs for being used by the instruction-executing systems, apparatuses or devices or used by any combination of the instruction-executing systems, apparatuses or devices. Specific examples (a non-exhaustive list) of the computer-readable media include the following: electrical connecting components (electronic devices) having one or more wirings, portable computer discs or cartridges (magnetic devices), random access memories (RAMs), read-only memories (ROMs), erasable and programmable read-only memories (EPROMs or flash memories), fiber optic devices, and portable optical compact disc read-only memories (CDROMs). Moreover, the computer-readable media may even be papers or other suitable media on which the programs are printed. The papers or the other suitable media may be, for example, optically scanned, and then edited, interpreted, or, if necessary, processed by other suitable ways to electronically obtain the programs, which are then stored in memories of computers.

It should be understood that various parts of the embodiments of the present disclosure may be implemented by hardware, software, firmware or any combination thereof. In the aforementioned embodiments, the operations or the methods may be implemented by software or firmware stored in memories and executed by suitable instruction-executing systems. For example, if implemented by hardware, the operations or methods may be implemented by any one or any combination of the following techniques known in the art: discrete logic circuits having logic circuits for implementing logic functions with respect to digital signals, application specific integrated circuits having suitably combined logic circuits, programmable gate arrays (PGAs), field programmable gate arrays (FPGAs), and the like.

Although the embodiments of the present disclosure have been illustrated and described above, it is to be appreciated that the foregoing embodiments are illustrative and cannot be considered as limitations to the present disclosure. Those skilled in the art may change, modify, replace and vary the foregoing embodiments within the scope of the present disclosure.

What is claimed is:

1. An image processing method for converting a color block image into a first imitating image,
   wherein the color block image comprises a plurality of image pixel units arranged in a predetermined array pattern, wherein each of the plurality of image pixel units comprises a plurality of original pixels having a same color;
   wherein the first imitating image comprises a plurality of imitating pixels arranged in the predetermined array pattern;
   wherein the plurality of imitating pixels comprise a current pixel, and the plurality of original pixels of a first image pixel unit of the plurality of image pixel units comprise a related pixel corresponding to a position of the current pixel; and
   the image processing method comprising:
      determining whether a color of the current pixel is same as a color of the related pixel;
      when the color of the current pixel is same as the color of the related pixel, using a pixel value of the related pixel as a pixel value of the current pixel; and
      when the color of the current pixel is different from the color of the related pixel, using pixel values of a related pixel unit comprising a plurality of pixels to calculate the pixel value of the current pixel through interpolation,
      wherein a color of the plurality of pixels of the related pixel unit is same as the current pixel, and the plurality of pixels of the related pixel unit are located in a first set of image pixel units in the plurality of image pixel units, wherein the first set of image pixel units neighbor the first image pixel unit.

2. The image processing method of claim 1, wherein the predetermined array pattern is a Bayer pattern.

3. The image processing method of claim 1, wherein each of the plurality of image pixel units comprise the plurality of original pixels arranged in a 2*2 array.

4. The image processing method of claim 1, wherein using the pixel values of the related pixel unit comprising the plurality of pixels to calculate the pixel value of the current pixel through interpolation comprises:
   for each component direction, calculating a pixel value of a corresponding first pixel interpolated between first pixels of the related pixel unit in an interpolation direction and a pixel value of a corresponding second pixel interpolated between second pixels of the related pixel unit in the interpolation direction, wherein a component direction crosses the interpolation direction, and calculating a corresponding difference value between the pixel value of the corresponding first pixel and the pixel value of the corresponding second pixel;
   for each component direction, calculating a corresponding weight based on the corresponding difference value of each component direction; and using the corresponding weight of each component direction, and the pixel value of the corresponding first pixel and the pixel value of the corresponding second pixel of each component direction to calculate the pixel value of the current pixel.

5. The image processing method of claim 1, wherein before using the pixel values of the related pixel unit comprising the plurality of pixels to calculate the pixel value of the current pixel through interpolation, the image processing method further comprises:
   performing white balance compensation on the color block image; and wherein after using the pixel values of the related pixel unit comprising the plurality of pixels to calculate the pixel value of the current pixel through interpolation, the image processing method further comprises:
   performing white balance compensation restoration on the first imitating image.

6. The image processing method of claim 1, wherein before using the pixel values of the related pixel unit comprising the plurality of pixels to calculate the pixel value of the current pixel through interpolation, the image processing method further comprises:
   performing dead pixel compensation on the color block image.

7. The image processing method of claim 1, wherein before using the pixel values of the related pixel unit comprising the plurality of pixels to calculate the pixel value of the current pixel through interpolation, the image processing method further comprises:
   performing crosstalk compensation on the color block image.

8. The image processing method of claim 1, wherein after using the pixel values of the related pixel unit comprising the plurality of pixels to calculate the pixel value of the current pixel through interpolation, the image processing method further comprises:
   performing lens shading correction, demosaicing, noise reduction, and edge sharpening on the first imitating image.

9. An imaging apparatus, comprising:
   an image sensor configured to generate a color block image; and
   an image processing apparatus configured to convert the color block image into a first imitating image,
      wherein the color block image comprises a plurality of image pixel units arranged in a predetermined array pattern, wherein each of the plurality of image pixel units comprises a plurality of original pixels having a same color;
      wherein the first imitating image comprises a plurality of imitating pixels arranged in the predetermined array pattern;
      wherein the plurality of imitating pixels comprise a current pixel, and the plurality of original pixels of a first image pixel unit of the plurality of image pixel units comprise a related pixel corresponding to a position of the current pixel; and
      wherein the image processing apparatus comprises:
         a determining module configured to determine whether a color of the current pixel is same as a color of the related pixel;
         a first calculating module configured to, when the color of the current pixel is same as the color of the related pixel, use a pixel value of the related pixel as a pixel value of the current pixel; and
         a second calculating module configured to, when the color of the current pixel is different from the color of the related pixel, use pixel values of a related pixel unit comprising a plurality of pixels to calculate the pixel value of the current pixel through interpolation, wherein a color of the plurality of pixels of the related pixel unit is same as the current pixel, and the plurality of pixels of the related pixel unit are located in a first set of image pixel units in the plurality of image pixel units, wherein the first set of image pixel units neighbor the first image pixel unit.

10. The imaging apparatus of claim 9, wherein the predetermined array pattern is a Bayer pattern.

11. The imaging apparatus of claim 9, wherein each of the plurality of image pixel units comprise the plurality of original pixels arranged in a 2*2 array.

12. The imaging apparatus of claim 9, wherein the second calculating module comprises:
    a first calculating unit configured to, for each component direction, calculate a pixel value of a corresponding first pixel interpolated between first pixels of the related pixel unit in an interpolation direction and a pixel value of a corresponding second pixel interpolated between second pixels of the related pixel unit in the interpolation direction, wherein a component direction crosses the interpolation direction, and calculate a corresponding difference value between the pixel value of the corresponding first pixel and the pixel value of the corresponding second pixel;
    a second calculating unit configured to, for each component direction, calculate a corresponding weight based on the corresponding difference value of each component direction; and
    a third calculating unit configured to use the corresponding weight of each component direction, and the pixel value of the corresponding first pixel and the pixel value of the corresponding second pixel of each component direction to calculate the pixel value of the current pixel.

13. The imaging apparatus of claim 9, wherein the image processing apparatus further comprises:
    a white balance compensating module configured to perform white balance compensation on the color block image; and
    a white balance compensation restoring module configured to perform white balance compensation restoration on the first imitating image.

14. The imaging apparatus of claim 9, wherein the image processing apparatus further comprises:
    a dead pixel compensating module configured to perform dead pixel compensation on the color block image.

15. The imaging apparatus of claim 9, wherein the image processing apparatus further comprises:
    a crosstalk compensating module configured to perform crosstalk compensation on the color block image.

16. The imaging apparatus of claim 9, wherein the image processing apparatus further comprises:
    a processing module configured to perform lens shading correction, demosaicing, noise reduction, and edge sharpening on the first imitating image.

17. A method performed by an imaging apparatus, comprising:
    taking a plurality of images using a plurality of imaging parameters under a predetermined light environment;
    processing the plurality of images to obtain a plurality of crosstalk compensation parameters;
    storing the plurality of crosstalk compensation parameters;
    taking a color block image;
    performing crosstalk compensation on the color block image using the plurality of crosstalk compensation parameters; and
    converting the color block image into a first imitating image,
        wherein the color block image comprises a plurality of image pixel units arranged in a predetermined array pattern, wherein each of the plurality of image pixel units comprises a plurality of original pixels having a same color;
        wherein the first imitating image comprises a plurality of imitating pixels arranged in the predetermined array pattern;
        wherein the plurality of imitating pixels comprise a current pixel, and the plurality of original pixels of a first image pixel unit of the plurality of image pixel units comprise a related pixel corresponding to a position of the current pixel; and
        wherein converting the color block image into the first imitating image comprises:
            determining whether a color of the current pixel is same as a color of the related pixel;
            when the color of the current pixel is same as the color of the related pixel, using a pixel value of the related pixel as a pixel value of the current pixel; and
            when the color of the current pixel is different from the color of the related pixel, using pixel values of a related pixel unit comprising a plurality of pixels to calculate the pixel value of the current pixel through interpolation,
                wherein a color of the plurality of pixels of the related pixel unit is same as the current pixel, and the plurality of pixels of the related pixel unit are located in a first set of image pixel units in the plurality of image pixel units, wherein the first set of image pixel units neighbor the first image pixel unit.

18. The method of claim 17, wherein the predetermined array pattern is a Bayer pattern.

19. The method of claim 17, wherein each of the plurality of image pixel units comprise the plurality of original pixels arranged in a 2*2 array.

20. The method of claim 17, wherein using pixel values of using the pixel values of the related pixel unit comprising the plurality of pixels to calculate the pixel value of the current pixel through interpolation comprises:
    for each component direction, calculating a pixel value of a corresponding first pixel interpolated between first pixels of the related pixel unit in an interpolation direction and a pixel value of a corresponding second pixel interpolated between second pixels of the related pixel unit in the interpolation direction, wherein a component direction crosses the interpolation direction, and calculating a corresponding difference value between the pixel value of the corresponding first pixel and the pixel value of the corresponding second pixel;
    for each component direction, calculating a corresponding weight based on the corresponding difference value of each component direction; and using the corresponding weight of each component direction, and the pixel value of the corresponding first pixel and the pixel value of the corresponding second pixel of each component direction to calculate the pixel value of the current pixel.

* * * * *